(12) United States Patent
Piaulet et al.

(10) Patent No.: US 6,814,410 B2
(45) Date of Patent: Nov. 9, 2004

(54) MOVEMENT MANAGEMENT SYSTEM FOR ONE OR MORE VEHICLE SEATS

(75) Inventors: Jen-François Piaulet, Deols (FR); Hugues Legras, Issoudun (FR); Laurent Groussin, Le Poinçonnet (FR); Pascal Moulin, St. Valentin (FR); Alain Berthouloux, Chateauroux (FR)

(73) Assignee: PGA Electronic, Chateauroux (FR)

( * ) Notice: Subject to any disclaimer, the term of this patent is extended or adjusted under 35 U.S.C. 154(b) by 88 days.

(21) Appl. No.: 10/148,697

(22) PCT Filed: Nov. 30, 2000

(86) PCT No.: PCT/FR00/03343

§ 371 (c)(1),
(2), (4) Date: Sep. 20, 2002

(87) PCT Pub. No.: WO01/40013

PCT Pub. Date: Jun. 7, 2001

(65) Prior Publication Data

US 2003/0075964 A1 Apr. 24, 2003

(30) Foreign Application Priority Data

Dec. 1, 1999 (FR) .......................................... 99 15135

(51) Int. Cl.⁷ .............................. B60N 2/02; G05G 5/00
(52) U.S. Cl. ..................... 297/361.1; 297/330; 312/626
(58) Field of Search ............................. 297/330, 361.1; 318/53, 652, 626

(56) References Cited

U.S. PATENT DOCUMENTS

| 4,434,468 A | | 2/1984 | Caddick et al. |
| 4,463,426 A | | 7/1984 | Caddick et al. |
| 4,669,780 A | | 6/1987 | Sakakibara et al. |
| 4,994,554 A | * | 2/1991 | Audhya et al. ............. 530/327 |
| 5,254,924 A | | 10/1993 | Ogasawara |
| 5,751,129 A | * | 5/1998 | Vergin ......................... 318/467 |
| 5,822,707 A | | 10/1998 | Breed et al. |
| 5,887,949 A | | 3/1999 | Kodaverdian |
| 5,930,152 A | | 7/1999 | Dumont et al. |
| 6,078,854 A | * | 6/2000 | Breed et al. ................... 701/49 |
| 6,194,853 B1 | * | 2/2001 | Tual et al. ................... 348/266 |
| 6,659,562 B2 | * | 12/2003 | Uchiyama ................ 297/423.3 |

FOREIGN PATENT DOCUMENTS

| DE | 29717317 U1 | * | 4/1998 |
| FR | 2 467 437 | | 4/1981 |
| FR | 2 736 879 | | 1/1997 |
| FR | 2 748 240 | | 11/1997 |
| FR | 2 781 293 | | 1/2000 |

* cited by examiner

Primary Examiner—Peter M. Cuomo
Assistant Examiner—Joseph Edell
(74) Attorney, Agent, or Firm—Thelen Reid & Priest LLP

(57) ABSTRACT

The invention concerns a system for managing movements between different parts of at least one vehicle seat, which at each connection (l1, l2, l3) positioned between a first seat part and a second seat part, comprises actuators (A1, A2, A3) of the first seat part relative to the second seat part that are associated with memorization and control systems (R1; F1, R2, F2; R3, F3) of the end positions of each part and of the limit transmission forces of the actuators. In the event that the movements of several seats need to be managed, this system comprises a link bus (6) ensuring the connection between the seats and one or more central units.

9 Claims, 1 Drawing Sheet

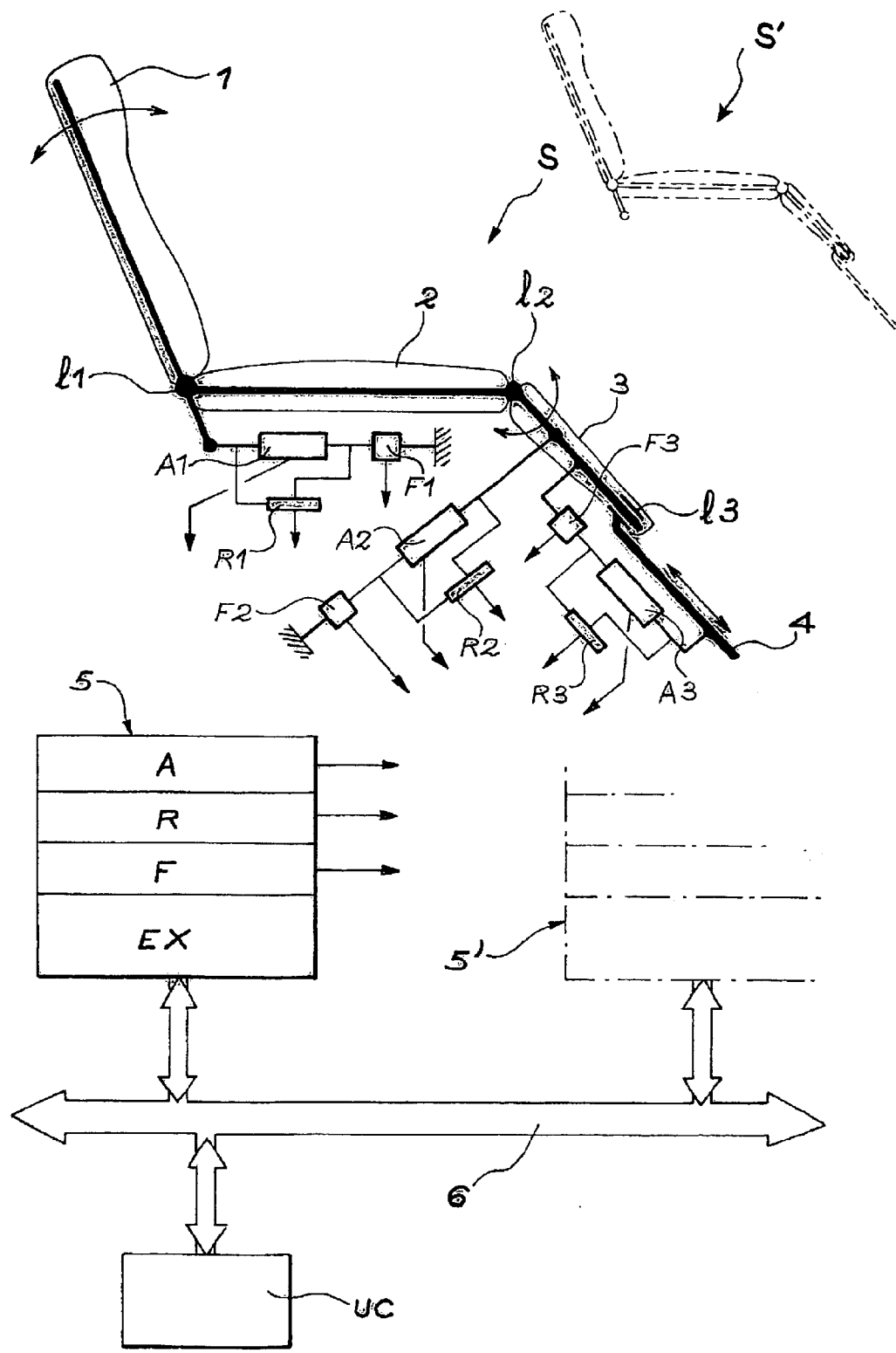

MOVEMENT MANAGEMENT SYSTEM FOR ONE OR MORE VEHICLE SEATS

FIELD OF THE INVENTION

The invention concerns a system for managing the movements of different parts of one or more vehicle seats.

The invention applies to numerous types of seats, such as motor vehicle seats, train seats or boat seats; it applies in particular to aeroplane seats.

STATE OF THE ART

At the present time, numerous types of vehicle seats exist with which it is possible to change the position of one of the seat parts relative to another seat part. In particular, aeroplane seats are all designed so that the passenger can be seated in a semi-lying position or in an upright sitting position (in particular for take-off and landing), or in intermediate positions. Traditionally, for aeroplane seats, the mobile parts of the seat are the back part, the leg-rest and the footrest, the seat part generally being fixed. These parts are often actuated relative to one another by a mechanical system or an electro-mechanical system, that is to say which is electrically controlled and mechanically actuated.

However, irrespective of the type of actuation, it is always necessary to have stops which limit the movement of the different parts, firstly to avoid damage to the equipment and secondly to ensure the safety and comfort of passengers. These stop parts are often mechanical. They may also be formed of end-distance sensors positioned at the ends of the actuating rod.

U.S. Pat. No. 5,887,949 describes an aeroplane seat in which the positions of the footrest and leg-rest are controlled so that the footrest does not hit the floor when the leg-rest changes from the lying position to the sitting position. In this device, position control is made by means of an end-distance sensor. These end-distance sensors, like the mechanical stops, are fixed to the seat either during the manufacture of the seat or at the time the seat is fitted in the aeroplane. However, it is sometimes necessary to change the position of a stop part or the limit value of an end-distance sensor once the seat has been installed, for example should the layout of the aeroplane require a change to the vertical position of a back part. In this case, the only possibility is to modify the limit value of the stop part on site. Consequently, if the stop parts of all the seats of an aeroplane have to be modified, this leads to considerable cost both in terms of time and of expense.

Moreover, a motor vehicle seat exists in which the position of the seat part and the position of the back part are calculated one in relation to the other, so that the overall position of the seat meets safety criteria.

For this purpose, the movements of the seat part and back part, one relative to the other, are controlled by electric motors and detected by potentiometers. This type of seat is described in patent application FR-A-2 736 879.

However, with this device the position of the seat part and back part are controlled in dependent manner in relation to one another. This device cannot therefore be adapted to a seat comprising numerous parts (head-rest, leg-rest, footrest, arm-rests, etc.), which may be moved independently from one another.

Document FR-A-2 748 240 describes a system for actuating seat parts, wherein each part is actuated by means of an actuator. The actuators of two adjacent seats are controlled by centralised processing unit, additionally connected to a keyboard or a card reader corresponding to each seat. Preregulated positions of the different seat parts can thus be memorised, between the end positions.

DESCRIPTION OF THE INVENTION

The object of the invention is precisely to remedy the disadvantages of the previously described devices.

For this purpose, it puts forward a movement management device for the different parts of a seat, in which each part may be moved dependently or independently from the others, according to the position wished by the passenger.

More precisely, the invention concerns a movement management system for the parts of at least one vehicle seat, which at each connection placed between a first and a second part of the seat comprises means for actuating the first part relative to the second part, associated with memorisation and control means of the end positions of each part, characterized in that it comprises memorisation and control means of the limit transmission forces of the actuating means of each part and a command unit connected to each of the memorisation and control means, said command unit being integrated in an actuation means.

According to one variant of the invention, the memorisation and control means comprise a potentiometric copying system of the end positions. According to another variant, they comprise an impulse system for position copying with re-locking.

According to one embodiment of the invention, the memorisation and control means comprise a copying system of limit transmission forces by current measurement.

According to another embodiment, they comprise a system for copying limit transmission forces which uses stress gauges.

According to a further embodiment, they comprise a potentiometric copying system of limit transmission forces.

Advantageously, the values of the end positions and the values of the limit transmission forces can be modified at the command unit.

The invention also applies to the movement management of several seats. In this case, the command unit of each seat is, by means of at least one bus, connected to the command units of the other seats and/or to at least one central unit. In this case, the values of the limit transmission forces and of the end positions may be modified from the central unit.

BRIEF DESCRIPTION OF THE FIGURES

The FIGURE gives a diagram of an example of a seat according to the invention, equipped with actuating and control means with which the movement of the seat parts can be managed.

DETAILED DESCRIPTION OF THE EMBODIMENTS OF THE INVENTION

The invention concerns a movement management system for the parts of one or more vehicle seats, by controlling the end positions of each seat part, and the limit transmission forces of the actuation means which ensure the movement of one seat part relative to another seat part.

For a better understanding of the invention, the diagram in the FIGURE shows a seat and the different means used to move the mobile parts of this seat.

The seat, shown in the FIGURE, is denoted S; it comprises a back part 1, a seat part 2, a leg-rest 3 and a foot-rest 4. On this seat S, it can be seen that the back part 1 articulates via a rotation movement around the edge of seat part 2, that the leg-rest also articulates via a rotation movement around the other edge of seat part 2, and finally that the footrest 4 can be translated relative to leg-rest 3. In this example of a seat, there are therefore three connections between the four parts of this seat. These connections are the following:

connection 11, which is an articulation between back part 1 and seat part 2;

connection 12 is also an articulation between seat part 2 and leg-rest 3; and connection 12 is a translation connection between leg-rest 3 and foot-rest 4.

Each of these connections 11, 12 and 13 is obtained by means of a system comprising firstly an actuation means, respectively A1, A2 and A3, and secondly memorization and control means for the end positions of the parts and limit transmission forces denoted (R1, F1), (R2, F2), (R3, F3). All these connections 11, 12 and 13 are controlled from a command unit, denoted 5.

For a better understanding of the invention, a more detailed description will be given of one of the connections between two seat parts, namely connection 11. This is made up of the following assembly: an actuation means A1, also called "actuator", an end position copying system forming said memorization and control means R1 for the end positions between the back part 1 and seat part 2, and a copying system for limit transmission forces forming said memorization and control means F1 for the limit transmission forces between the back part 1 and the seat part 2. In the case of connection 11 the transmission force is the rotation couple.

The functioning of this connection 11 is as follows: when a passenger wishes to change the position of the back part, he/she actuates a change command for the seat back position) not shown in the FIGURE for reasons of simplification) and chooses the angle of slant of back part 1 relative to seat part 2. This change in the position of back part 1 relative to seat 2 is made via actuator A1 for as long as neither the end position registered in R1 nor the limit force recorded by F1 have been reached.

All the other seat connections, that is to say connections 12 and 13 function in the same manner as connection 11 except that in respect of connection 13, a translation movement is involved and not a movement of rotation of one part relative to another. For a rotation movement, actuation is made along an axis. For a translation movement, actuation is made along a surface. Also, for cushion inflation, for example to adjust low-back support, actuation is made along a surface.

According to one embodiment of the invention, the copying system of the end positions may be of potentiometric type or of impulse type with re-locking.

The copying of limit forces may be made by reading of the current consumption circulating in the actuator, or by means of stress gauges, or further by means of a potentiometer.

Each of the assemblies for actuation A and for memorisation of end positions and limit forces (R, F) is connected to a command unit, denoted 5. This command unit comprises several command levels, namely a level A intended to manage actuators A1, A2 and A3, a level R intended to manage end-distance limits (in other words the management of the end positions of the different seat parts) whose role is to manage the copying systems R1, R2 and R3, and a level F intended to manage the limit forces, whose role is to manage the copying systems of limit forces F1, F2 and F3.

This command unit 5 also comprises a level of internal and external communications for the seat, called level "EX" whose role will be explained below.

According to the embodiment of the invention shown in this FIGURE, the system comprises a link bus 6 which ensures the communication of information between the command unit 5 associated with the seat S, and the command units 5' associated with the other seats denoted S'. This link bus 6 is also used to transmit information towards a central unit, denoted UC, or towards several central units, or towards another device connected to this bus.

The EX level of the command unit 5 ensures firstly the exchange of data within the seat, and secondly the exchange of data towards the other seats or towards the central units. More precisely, this level of communication EX is connected to a link bus 6 which ensures the information link between the different seats and the different central units which may be connected to the network.

According to the embodiment shown in the FIGURE, the command unit 5 is connected to the actuators, to the copying system of the end positions and to the copying system of the limit forces. In this case, the command unit may be placed either in the seat or outside the seat.

According to another embodiment of the invention, the command unit 5 may be integrated in either one of the seat actuators.

With the system of the invention, it is therefore possible to modify the different end positions of the parts and the different limits of transmission forces of the seat actuation means, electronically from a command unit 5 or from the central unit UC. These changes in the limit values of position and forces may therefore be entered remotely, without the need to send an operator to the site.

In addition, should the seat have manual release actuation means, the system of the invention ensures the memorisation of the absolute position when the manual release has been actuated.

Moreover, when several seats are connected together via a bus 6, it is possible to modify the limit values for position and transmission forces of all the seats, in one same operation from the central unit UC. In this way it is possible to achieve uniform or selective adjustment of all the seats.

For reasons of simplification of the FIGURE, the seat shown in the FIGURE comprises four parts, namely a back part, a seat part, a leg-rest and a foot-rest. However, the invention may also be applied to movements of a head-rest or to movements of arm-rests. It may also be applied to the movement of cushions and covers on luxury seats and to movements of low-back rests (depth, height or lateral movements of these low-back rests), actuation possibly being mechanical (as described in the FIGURE,) but also pneumatic, hydraulic or electric. This system may also be applied to movement of the seat part, should this part be mobile.

What is claimed is:

1. A system for managing relative movements between different parts of a vehicle seat, said parts being interconnected by connections and each part having modifiable end positions, wherein the vehicle seat comprises, at each of said connections, actuation means for controlling said relative movements, first memorization and control means of the end positions of each part, second memorization and control means of limit transmission forces of the actuation means and wherein a command unit is connected to all the memorization and control means of the seat, the command unit being integrated in one of said actuation means.

2. System for managing relative movements according to claim 1, wherein each first memorization and control means comprise a potentiometric system for position copying.

3. System for managing relative movements according to claim 1, wherein each first memorization and control means comprise an impulsive system with retiming.

4. System for managing relative movements according to claim 1, wherein each second memorization and control means comprise a system for copying forces by current measurement.

5. System for managing relative movements according to claim 1, wherein each second memorization and control means comprise a system for copying forces using stress gauges.

6. System for managing relative movements according to claim 1, wherein each second memorization and control means comprise a potentiometric system for copying forces.

7. System for managing relative movements according to claim 1, wherein the command unit is adapted to modify the values of the end positions and the values of the limit transmission forces.

8. System according to claim 1 for managing relative movements between the parts of several seats, wherein the command unit of each seat is connected by means of a bus, to the command units of the other seats and to at least one central unit.

9. System according to claim 8, wherein said central unit is adapted to modify the values of the end positions and the values of the limit transmission forces.

* * * * *